United States Patent [19]
Takagi et al.

[11] 3,986,770
[45] Oct. 19, 1976

[54] MOVIE CAMERA ADAPTED FOR SIMULTANEOUS MOTION PICTURE AND MAGNETIC SOUND RECORDING ON FILM

[75] Inventors: Katsuhide Takagi, Okaya; Toshiro Fukasawa, Nagano, both of Japan

[73] Assignee: Sankyo Kogaku Kogyo Kabushiki-Kaisha, Suwa, Japan

[22] Filed: Apr. 25, 1975

[21] Appl. No.: 571,879

[30] Foreign Application Priority Data

Apr. 27, 1974 Japan.................................. 49-47930

[52] U.S. Cl.................................... 352/27; 352/29; 352/72; 352/74
[51] Int. Cl.²................... G03B 31/02; G03B 23/02
[58] Field of Search.................. 352/27, 29, 30, 72, 352/74, 78 R

[56] References Cited
UNITED STATES PATENTS

| | | | |
|---|---|---|---|
| 3,807,841 | 4/1974 | Dudley et al. | 352/72 |
| 3,825,327 | 7/1974 | Kosarko et al. | 352/74 |
| 3,880,504 | 4/1975 | Marvin | 352/27 |

*Primary Examiner*—Russell E. Adams, Jr.
*Attorney, Agent, or Firm*—Pollock, Vande Sande & Priddy

[57] ABSTRACT

A movie camera of the kind adapted for simultaneous motion picture and magnetic sound recording on a film in a cartridge, in which sound recording means including a magnetic recording head and a capstan are disposed in the camera body, and a swingable lever carrying sound recording means including a pinch roller is disposed in the camera body to be held in a retracted position when the cover of the camera is fully opened and kept in such position for the loading and unloading of the cartridge. In the movie camera, means are provided so that the pinch roller carried by the swingable lever can be urged to a position closely adjacent to the capstan and held temporarily in such position when the cartridge is loaded and the cover is closed, and then the pinch roller can be urged further toward the capstan to bring the sound recording track portion of the film into pressure contact with the capstan in response to the manipulation of the release for starting the motion picture taking operation.

6 Claims, 10 Drawing Figures

MOVIE CAMERA ADAPTED FOR SIMULTANEOUS MOTION PICTURE AND MAGNETIC SOUND RECORDING ON FILM

BACKGROUND OF THE INVENTION

This invention relates to a small-sized movie camera adapted for simultaneous motion picture and magnetic sound recording on a film contained in a cartridge.

Small-sized movie cameras of the king using a cartridge containing a film having a sound recording track thereon have very recently appeared in the market. In such movie cameras, sound can be simultaneously magnetically recorded on the sound recording track portion of the film in the cartridge during the motion picture taking operation. A variety of improved movie cameras of this kind will gradually come into wide use in this field of photography. A film cartridge used commonly in a movie camera of this kind has generally a shape as shown in FIG. 1. Referring to FIG. 1, a recess is formed in one side of a generally square-shaped casing of the film cartridge 2, and a film 3 having a sound recording track portion is disposed so that it can travel across this recess during the motion picture taking operation.

In a movie camera of this kind commercially available in the market, sound recording means such as a magnetic recording head and a capstan are mounted in the camera body so that they can be located opposite to one side of the film 3 in the cartridge 2 when the cartridge 2 is loaded in the camera body, and a swingable lever carrying other sound recording means such as a pinch roller and a pad is swingably mounted in the camera body so as to bring the pinch roller to a position opposite to the capstan on the other side of the film 3 in the cartridge 2. When the cover of the movie camera is fully opened and kept in such position for the purpose of loading and unloading of the cartridge 2, the swingable lever is swung downward to a retracted position in which the pinch roller is sufficiently spaced apart from the sound recording track portion of the film 3. When the cartridge 2 is loaded in the movie camera and the cover is closed, the swingable lever is swung upward in response to the cover closing manipulation to bring the pinch roller to a position closely adjacent to the capstan. In response to the manipulation of the release element for starting the motion picture taking operation, the pinch roller is urged slightly toward the capstan so that the sound recording track portion of the film 3 moving across the recess of the cartridge 2 can be pressed against the capstan by the pinch roller.

SUMMARY OF THE INVENTION

It is a primary object of the present invention to provide an improved movie camera of this kind which can be easily manufactured and assembled.

In accordance with the present invention, there is provided a movie camera adapted for simultaneous motion picture and sound recording on a film in a cartridge comprising a camera body having a laterally openable side cover, magnetic sound recording means including a magnetic sound recording head, a pinch roller and a capstan in said camera body, a swingable lever carrying some of said sound recording means including said pinch roller thereon, means for holding said swingable lever in a retracted position vertically spaced apart from the sound recording track portion of the film in said cartridge when said cover is fully opened and kept in such position for the purpose of loading and unloading of said cartridge, means for causing swinging movement of said swingable lever to bring said pinch roller to a position closely adjacent to said capstan on one side of the sound recording track portion of the film in said cartridge and holding temporarily said pinch roller in such position when said cartridge is loaded and said cover is closed on said camera body, means for causing further movement of said pinch roller toward said capstan to bring the sound recording track portion of the film into pressure contact with said capstan in response to the manipulation of trigger means for starting the motion picture taking operation, and means for ejecting automatically said cartridge from said camera body in response to the manipulation of unlocking means upon completion of the motion picture and sound recording on the film in said cartridge.

According to the movie camera of the present invention, the pinch roller carried by the swingable lever can be brought to the position closely adjacent to the capstan in response to the closing of the cover and held temporarily in such position so that the pinch roller can then be lightly and reliably urged toward the capstan to hold the sound recording track portion of the film between it and the capstan. Further, means including cover locking means and means for ejecting automatically the cartridge from the camera body in response to the opening of the cover are mounted on a single mounting plate to facilitate the manufacture and assembling of the movie camera.

The above and other objects, features and advantages of the present invention will become apparent from the following detailed description taken in conjunction with the accompanying drawing.

DESCRIPTION OF THE PREFERRED EMBODIMENTS

Figure 1:
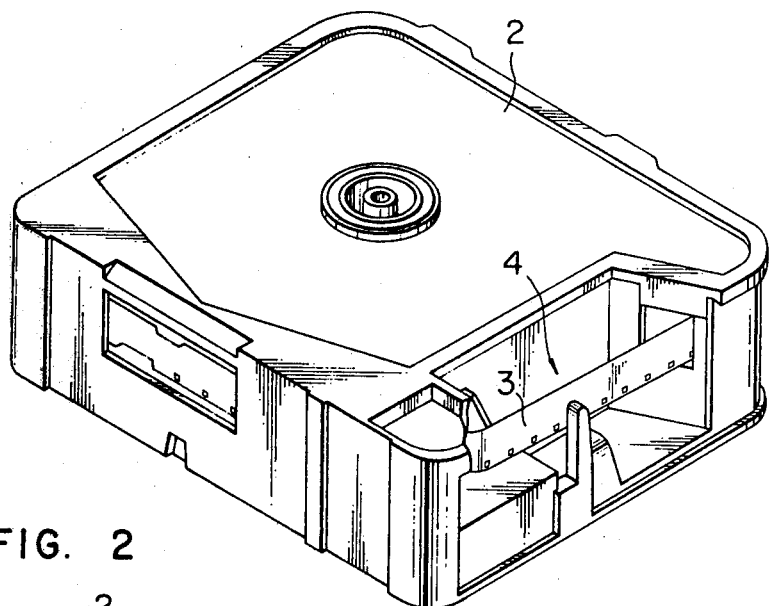
FIG. 1 is a perspective view of a commerically available film cartridge for use in a movie camera capable of simultaneous motion picture and sound recording.
Figure 2:
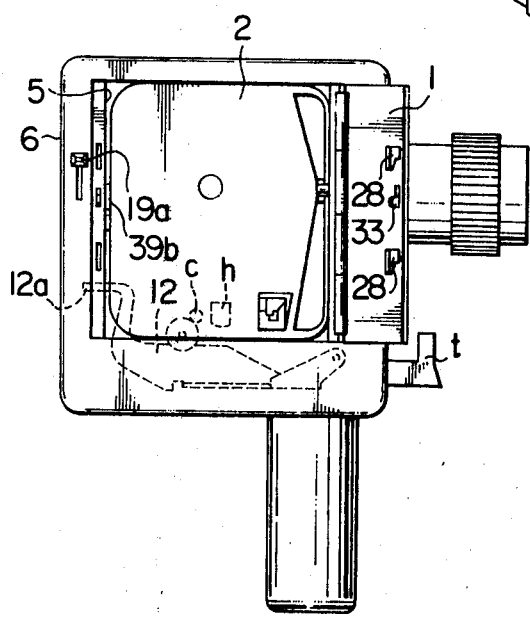
FIG. 2 is a side elevational view of a movie camera according to the present invention in a state in which a film cartridge as shown in FIG. 1 is mounted therein and a side cover is opened.

Referring to FIG. 2, a movie camera according to the present invention is shown in a state in which a laterally openable side cover 1 is fully opened and a known cartridge 2 containing a film of the type capable of simultaneous motion picture and magnetic sound recording is mounted therein. Such a cartridge 2 is shown in FIG. 1 in perspective fashion with its position reversed from that shown in Fig. 2. When the movie camera is operated for taking a motion picture, a film 3 having a sound recording track portion is moved at a uniform rate across a recess 4 formed in one side of the cartridge 2. When the cartridge 2 is mounted in the movie camera in a position as shown in FIG. 2, means such as a magnetic sound recording head h and a capstan c of a magnetic sound recording mechanism mounted in the camera body are located in the recess 4 opposite to one side of the sound recording track portion of the film 3, and other sound recording means such as a pad, a pinch roller and a film tension detector carried by a swingable lever 12 mounted in the camera body are located in the recess 4 opposite to the other side of the sound recording track portion of the film 3. (This swingable lever 12 will hereinafter be referred to as a pinch roller mounting lever.) In the full open position of the cover 1, the pinch roller mounting lever 12 is retracted sufficiently downward and kept in a position which does not obstruct loading and unloading of the cartridge 2. However, when the cover 1 is closed on the camera body, the pinch roller mounting lever 12 is urged upward to bring the pinch roller to a position closely adjacent to the capstan on one side of the sound recording track portion of the film 3 in the cartridge 2 so that the pinch roller can be temporarily maintained stationary in such a position as will be described later. In response to the manipulation of a release element for the purpose of taking a motion picture, the pinch roller mounting lever 12 operates in interlocking relation with this manipulation to urge the pinch roller slightly toward the capstan so that the sound recording track portion of the film 3 can be brought into pressure contact with the capstan by the pinch roller.

Various movable elements, which are essential parts of the movie camera according to the present invention, are mounted on the rear face of a plate 5 forming the rear wall of the cartridge receiving opening of the camera body in FIG. 2. That is, these movable elements are mounted on the face of the plate 5 opposite to the rear wall 6 of the camera housing. This plate 5 will therefore be referred to hereinafter as a mounting plate.

Figure 3:
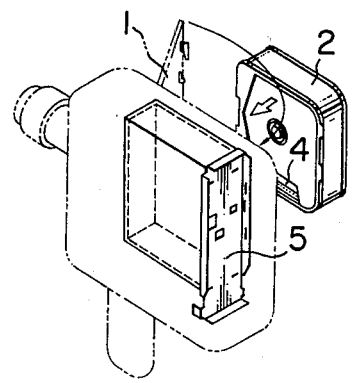
FIG. 3 is a perspective view of the movie camera of the present invention when viewed from the other side of FIG. 2, with the cartridge taken out of the camera and portions of the camera body shown by the chain lines.
Figure 4:
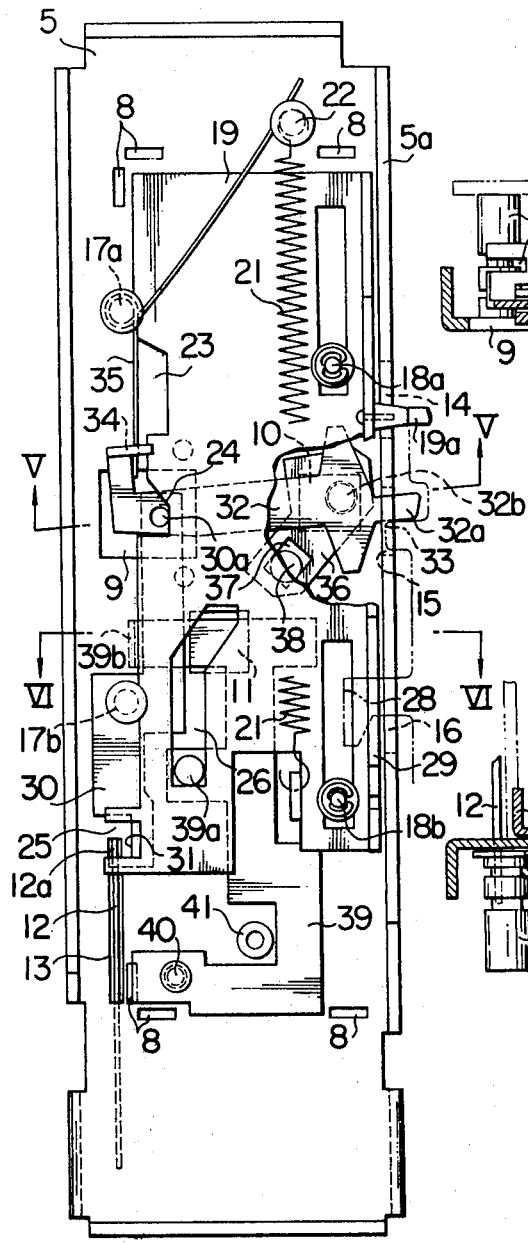
FIG. 4 is a front elevational view showing various parts of the movie camera of the present invention mounted on a mounting plate.

FIG. 4 shows the arrangement of these movable elements on the mounting plate 5 when the plate 5 is removed from the camera body and when viewed from the rear side of the camera. The mounting plate 5 is provided with a plurality of small perforations 8 which are engaged by associated engaging means provided on a stationary portion of the camera body so that the mounting plate 5 can be fixed to the stationary portion of the camera body as shown in FIG. 3. Apertures 9 and 10 are bored in the mounting plate 5 so that pivot pins 30a and 32b described later do not impinge against the mounting plate 5 during movement of these pivot pins. Another aperture 11 is bored in the mounting plate 5 so that a portion of an upper arm of an element 39 having a substantially inverted E-like shape described later can pass through this aperture 11 to extend along the opposite side of the mounting plate 5. Further, a guide slot 13 is formed in the mounting plate 5 so as to loosely receive therein the free end 12a of the pinch roller mounting lever 12 for guiding the movement of this free end 12a.

Figure 9:
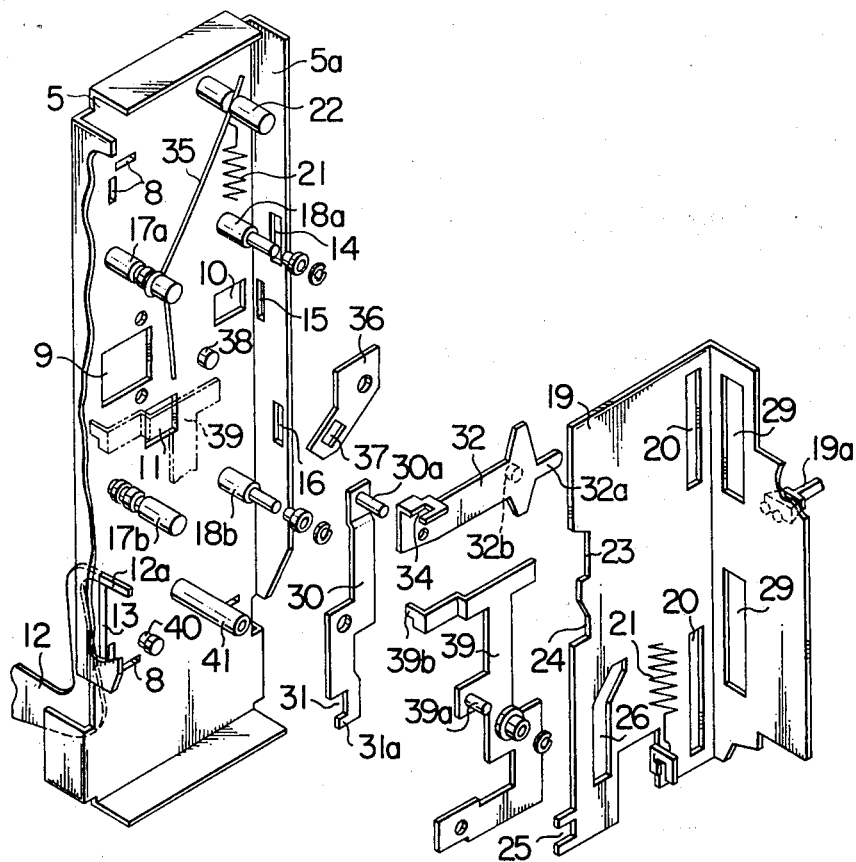
FIG. 9 is an exploded perspective view of the parts shown in FIG. 4.

A pair of vertically spaced slots 14 and 16 are bored in a bent edge portion 5a of the mounting plate 5 as best shown in FIG. 9 so as to receive therein respective locking hooks 28 projecting from the edge portion of the free end of the cover 1. Another slot 15 is also bored in the bent edge portion 5a of the mounting plate 5 so as to receive therein a lug 33 projecting also from the edge portion of the free end of the cover 1. A pair of vertically spaced stub shafts 17a and 17b each provided with a circumferential groove are fixedly mounted to the mounting plate 5, and another pair of vertically spaced stub shafts 18a and 18b each provided with an antifriction roller are also fixedly mounted to the mounting plate 5.

The stub shafts 17a and 17b engage with one side edge of a cam plate 19 the detailed structure of which is shown at the right-hand side of FIG. 9, and the stub shafts 18a and 18b are received in respective guide slots 20 of the cam plate 19. The stub shafts 18a and 18b act to support the cam plate 19 vertically slidable relative to the mounting plate 5. A compression spring 21 is anchored at one end thereof to a suitable portion of the cam plate 19 and at the other end thereof to another stub shaft 22 fixedly mounted to an upper portion of the mounting plate 5 so as to normally bias the cam plate 19 upward to a predetermined position relative to the mounting plate 5. An unlocking lub 19a is fixed integrally to the cam plate 19 and extends to the exterior of the camera body. Thus, when this unlocking lug 19a is forced downward, the cam plate 19 can be urged downward relative to the mounting plate 5.

A plurality of spaced cutouts 23, 24 and 25 are formed in one side edge of the cam plate 19 in the above order, and a guide slot 26 consisting of a lower straight portion and an upper inclining portion is bored in a lower portion of the cam plate 19 as shown in FIG. 9. The other side portion of the cam plate 19 is bent normal to the remaining portion, and a pair of vertically spaced slots 29 are bored in this bent portion of the cam plate 19 to receive therein the respective locking hooks 28 projecting from the portion of the cover 1 adjacent to the free end thereof. The unlocking lug 19a is fixed to this bent portion of the cam plate 19.

A lever 30 is mounted on the stub shaft 17a fixedly mounted to the mounting plate 5 so as to make swinging movement in the space defined between the mounting plate 5 and the cam plate 19. This lever 30 is formed at the end of the lower arm thereof with a cutout 31 which registers with the lower cutout 25 on the side edge of the cam plate 19 in the state shown in FIG. 4. Another lever 32 which is substantially in the form of an airplane is mounted at a portion adjacent to one end thereof (the left-hand end in FIG. 4) on a pivot pin 30a fixedly mounted to the end of the upper arm of the lever 20 so as to make swinging movement also in the space defined between the mounting plate 5 and the cam plate 19. The other end 32a (the right-hand end in FIG. 4) of this lever 32 extends loosely through the slot 15 bored in the bent edge portion 5a of the mounting plate 5. This end 32a of the lever 32 engages with the lug 33 provided adjacent to the free end of the cover 1 in a manner as described later when the cover 1 is closed, so that the lever 32 can swing around the pivot pin 30a when engaged by the lug 33. A cutout 34 is formed in end of the lever 32 in FIG. 9, and a spring 35 partly coiled around the stub shaft 17a fixedly mounted to the mounting plate 5 engages at one end thereof with this cutout 34 and at the other end thereof with a circumferential groove formed on the stub shaft 22. Thus, the pivot pin 30a, on which the lever 32 is mounted for swinging movement, is normally biased by the spring 35 to make pressure engagement with the left-hand side edge of the cam plate 19 in FIG. 4, and the lever 32 itself is normally biased to swing clockwise in FIG. 4 around the pivot pin 30a within an allowable range.

A pivot pin 32b is fixedly mounted to the rear face of the lever 32 at a position adjacent to the right-hand end thereof in FIG. 4. A strip 36 is mounted on this pivot pin 32b at a portion adjacent to one end thereof, and another stub shaft 38 fixedly mounted to the mounting plate 5 is fitted in a rectangular hole 37 bored in the strip 36 adjacent to the other end thereof. The diameter of this stub shaft 38 is substantially equal to the length of the short side of the rectangular hole 37. An element 39 of substantially inverted E-like shape shown at the center of FIG. 9 is disposed in the space defined between the mounting plate 5 and the cam plate 19. Another stub shaft 40 fixedly mounted to the mounting plate 5 is fitted in a hole bored adjacent to the end of the lower arm of the element 39, and a pin 39a fixedly mounted to the middle arm of the element 39 is received in the slot 26 bored in the cam plate 19. Further, the upper horizontal arm of the element 39 is bent stepwise as best shown in FIG. 9, and this bent portion passes through the aperture 11 of the mounting plate 5. The end of this bent portion designated by the reference numeral 39b in FIG. 9 is further bent normal to the bent portion to extend rearward in FIG. 4. This end 39b occupies a position as shown in FIG. 4 when the cover 1 is in the closed position. Referring to FIG. 2, this end 39b is shown disposed along the left-hand edge portion of the rear wall of the cartridge 2.

Figure 5:
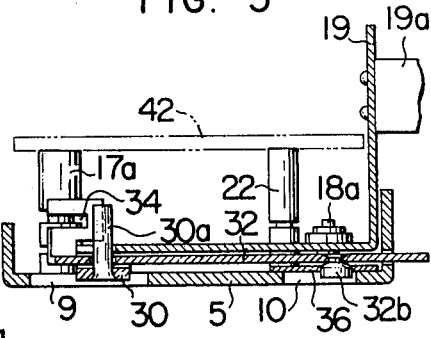
FIG. 5 is a section taken on the line V—V in FIG. 4.
Figure 6:
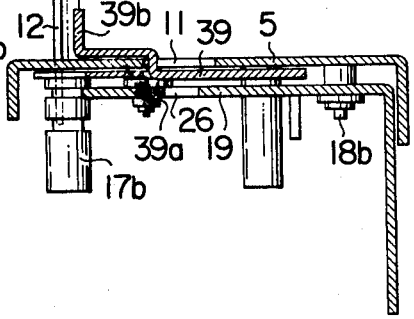
FIG. 6 is a section taken on the line VI—VI in FIG. 4.

A mounting board 42 for the sound recording electrical circuit is shown in FIG. 5 by the chain lines. This mounting board 42 is disposed to engage the head of the stub shafts 17a, 22 and 41 fixedly mounted to the mounting plate 5 and is fastened as by a screw to the stub shaft 41 so that it can be substantially integrally fixed to the mounting plate 5 in parallel relation to the mounting plate 5.

Figure 7:
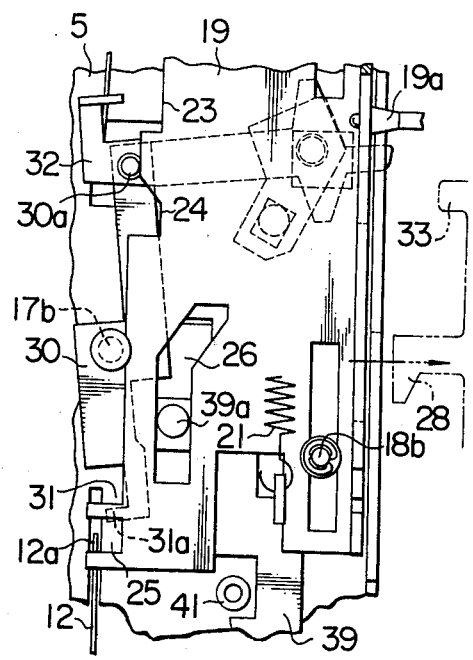
FIGS. 7 and 8 are a partial front elevational view and a front elevational view respectively showing how the relative positions of the parts shown in FIG. 4 change with the cover opening operation.

The operation of the first embodiment of the present invention will now be described with reference to FIGS. 4, 7 and 8.

FIG. 4 shows the relative positions of the movable elements on the mounting plate 5 in the state in which the cover 1 is closed on the camera body. When the cover 1 is fully opened and the hooks 28 and lug 33 on the free end of the cover 1 shown by the chain lines in FIG. 4 are urged toward the right in FIG. 4, the right-hand end 32a of the lever 32 of airplane-like shape is released from the engagement with the lug 33 of the cover 1 and swings clockwise around the pivot pin 30a since it has normally such a tendency. However, the swinging movement of the lever 32 is restricted by the engagement of the stub shaft 38 with one end of the rectangular hole 37 of the strip 36 arranged for interlocking operation with the lever 32. Thus, the lever 32 is maintained in a substantially horizontal state as shown in FIG. 8. When the cover 1 is closed in such a state, the lug 33 of the cover 1 engages with the sloped portion adjacent to the end 32a of the lever 32 so that the lever 32 is caused to swing counter-clockwise by the component of the engaging force. As a result, the end 32a of the lever 32 rides on the lug 33 of the cover 1 and the lever 32 takes the state shown in FIG. 4.

In the state shown in FIG. 4, the cutout 25 of the cam plate 19 registers with the cutout 31 of the lever 30, and the free end 12a of the pinch roller mounting lever 12 is urged to be pressed against the upper end of the slot 13 of the mounting plate 5 by the lower jaw of these cutouts 25 and 31. Therefore, the pinch roller mounting lever 12 is swung upward, and the pinch roller carried by the pinch roller mounting lever 12 is held stationary at a position closely adjacent to the capstan of one side of the sound recording track portion of the film 3 in the cartridge 2. Then, when the release element, for example, the trigger t shown in FIG. 2 is manipulated to start the motion picture taking operation, the pinch roller carried by the lever 12 is urged slightly toward the capstan in response to the manipulation of the trigger t to force the sound recording track portion of the film 3 in the cartridge 2 against the capstan, so that sound can be recorded in simultaneous relation with the motion picture taking operation.

Upon completion of recording of the motion picture and sound on the film 3 in the cartridge 2, the unlocking or cover opening lug 19a projecting from the cam plate 19 to the exterior of the camera housing is depressed downward in FIG. 2 to cause downward movement of the cam plate 19. In the early stage of the downward movement of the cam plate 19, the pivot pin 30a, on which the lever 32 of airplane-like shape is mounted for swinging movement, is brought to a position as shown in FIG. 7 with the result that the lever 30 swings counter-clockwise around the stub shaft 17b. The lower jaw 31a of the cutout 31 at the lower end of the lever 30 is retracted away from the path of the free end 12a of the pinch roller mounting lever 12, and this free end 12a of the pinch roller mounting lever 12 is urged downward while being held in the cutout 25 of the cam plate 19. In the meantime, the pivot pin 30a is shifted from the previous position engaging with the middle cutout 24 of the cam plate 19 to engage now with the upper cutout 23 of the cam plate 19. At this time, the locking hooks 28 of the cover 1 are released from the engagement with the slots 29 of the cam plate 19, and the cover 1 is slightly opened or turned around the axis of the hinge by the force of a suitable spring (not shown).

Figure 8:
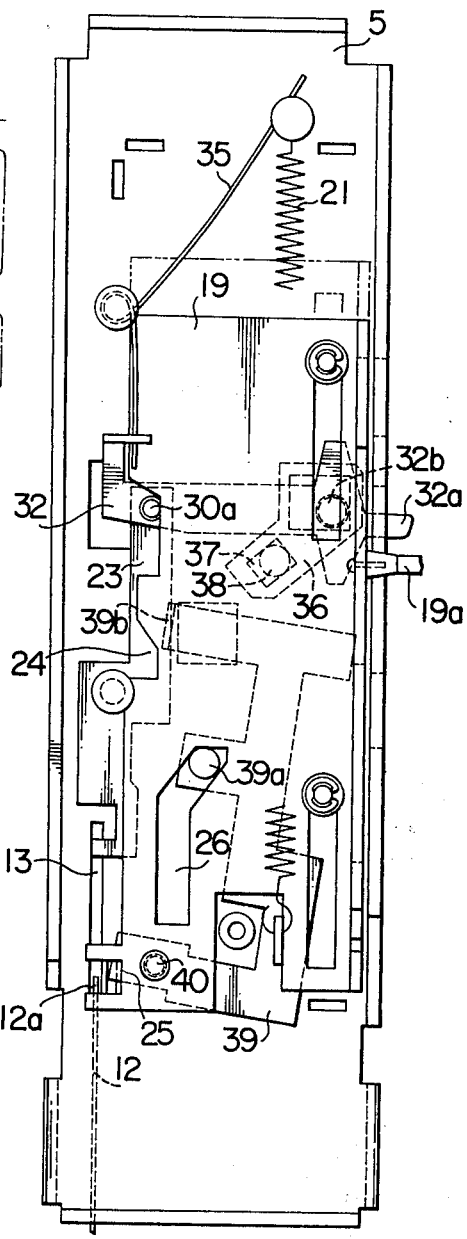

In the subsequent stage of the downward movement of the cam plate 19 due to the depression of the unlocking lug 19a, the pin 39a on the element 39 of substantially inverted E-like shape is admitted to the upper inclining portion of the slot 26 of the cam plate 19, with the result that the element 39 swings clockwise around the stub shaft 40 as shown in FIG. 8, and the end 39b of the bent portion of the element 39 acts to raise one side (the left-hand side of FIG. 2) of the cartridge 2 loaded in the camera. When this one side of the cartridge 2 is raised to some extent by the action of the end 39b in the manner above described, a known auxiliary spring (not shown) acts to eject the said side of the cartridge 2 from the cartridge receiving opening of the camera body so that the cartridge 2 can be easily taken out by hand. When the hand is released from the unlocking lug 19a at the same time, the cam plate 19 is urged slightly upward by the force of the spring 21, but any further upwward movement of the cam plate 19 is inhibited by the engagement of the pin 30a with the upper cutout 23 of the cam plate 19. Thus, the free end 12a of the pinch roller mpunting lever 12 is still held in the cutout 25 of the cam plate 19 to be maintained in the lower position. Therefore, the pinch roller mounting lever 12 is retracted downward away from the second recording track portion of the film 3 in the cartridge 2 and does not obstruct the unloading of the cartridge 2.

In the full open position of the cover 1, the relative positions of the lever 32 of airplane-like shape, the strip 36 pivoted to this lever 32 and the stub shaft 38 fitted in the rectangular hole 37 of the strip 36 are as shown by the chain lines in FIG. 8. In such a state, the lever 32 cannot make horizontal movement toward the left in FIG. 8 by being restricted by the stub shaft 38. When the cover 1 is closed on the camera body in this state, the lug 33 on the cover 1 engages with the sloped portion adjacent to the right-hand end 32a of the lever 32, with the result that the lever 32 is caused to swing counter-clockwise around the pivot pin 30a by the component of the force imparted by the lug 33, and at the same time, the lever 32 is urged toward the left against the force of the spring 35. Consequently, the pivot pin 30a is disengaged from the cutout 23 of the cam plate 19. Thus, the cam plate 19 is immediately urged upward to the predetermined upper position by the force of the spring 21. and the locking hooks 28 on the cover 1 are engaged by the slots 29 of the cam plate 19 to lock the cover 1 in the closed position. The end 32a of the lever 32 of the airplane-like shape overriding the lug 33 on the cover 1 is advanced into the recess formed above the lug 33 on the cover 1, and the pivot pin 30a engages now with the middle cutout 24 of the cam plate 19. Eventually, all the movable elements above described are restored to the original position shown in FIG. 4, and the pinch roller mounting arm 12 is urged upward and maintained in this position to prepare for sound recording.

Figure 10:
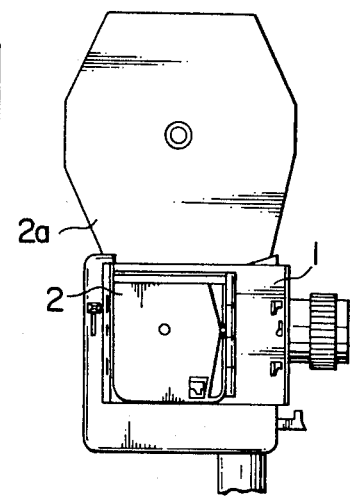
FIG. 10 is a view similar to FIG. 2 but showing another embodiment of the movie camera according to the present invention.

FIG. 10 shows another embodiment of the movie camera according to the present invention. Referring to FIG. 10, the camera body is equipped with an openable top wall, and a long-film container 2a is combined with an ordinary container 2 which can be mounted in the camera body so as to provide a cartridge adapted for containing a long film. This embodiment is similar to the first embodiment described with reference to FIGS. 2 to 9 in that various movable elements including a pinch roller mounting lever can be automatically controlled in response to the manipulation for opening and closing a laterally operable side cover 1.

A suitable indicator such as a convexity or a concavity may be provided on the cartridge to indicate whether or not the film contained therein is of the type capable of magnetic sound recording thereon, and this indicator may be utilized to disconnect the magnetic sound recording electrical circuit from the power source when a silent motion picture is taken, so that the movie camera according to the present invention can be used also as a movie camera for a silent motion picture. Further, although the present invention has been described with reference to the structure in which the mounting plate 5 is in itself the rear wall plate forming the rear wall of the cartridge receiving opening of the camera body, it is apparent that the present invention includes a modification in which the mounting plate 5 is prepared separately from the rear wall plate of the cartridge receiving opening and these plates are combined together to provide substantially an integral mounting plate structure.

It will be understood from the foregoing detailed description of the present invention that the movie camera of the kind adapted for simultaneous motion picture and sound recording on a film in a cartridge can be easily manufactured and assembled due to the fact that almost all of the movable elements essentially required for the movie camera of this kind can be compactly arranged in a limited zone behind the rear wall of the cartridge receiving opening of the camera body. Further, according to the present invention, the swingable lever carrying the sound recording means including the pitch roller is arranged for interlocking operation with the cover opening and closing manipulation, and the pinch roller carried by the lever can be urged to be maintained in a position closely adjacent to the capstan on one side of the sound recording track portion of the film in the cartridge in response to the closing of the cover to prepare for sound recording on the film. This arrangement is advantageous in that the pinch roller can be readily and reliably urged toward the capstan in response to the subsequent manipulation of the release element for starting the operation for taking a motion picture.

We claim:
1. A movie camera defining a cartridge chamber and adapted for simultaneous motion picture and sound recording on a film in the cartridge comprising:
   a camera body having a laterally operable side cover,
   a sound recording head and a capstan mounted in said camera body,
   a swingable lever supporting a pinch roller and first means for maintaining said swingable lever in a position wherein said pinch roller is spaced from the film when said cover is open,
   second means for moving said swingable lever to a position wherein said pinch roller is moved to a position closely adjacent said capstan and with said pinch roller and capstan respectively on opposite sides of the film in response to the closing of said cover,
   trigger means actuatable by the camera user at the initiation of a picture taking operation,
   third means responsive to actuation of said trigger means for further moving said pinch roller to a position wherein said pinch roller urges the film into pressure contact with said capstan,
   a mounting plate supported parallel to a rear wall of the camera body and defining on a first side thereof the rear wall of the cartridge chamber,
   a cam plate supported between the other side of said mounting plate and the rear wall of the camera body and parallel thereto,
   means responsive to the opening and closing of said side cover for moving said cam plate relative to said mounting plate,
   said first, second, and third means being positioned and supported in whole or in part in the space between said cam plate and said mounting plate.

2. The movie camera of claim 1 wherein said mounting plate defines therein at least one aperture receiving means responsive to at least one of said first, sedond, and third means for actuating said swingable lever.

3. In a sound motion picture camera having a plurality of walls and a cover partially defining a cartridge chamber which is adapted to receive a sound film cartridge having an aperture therein to provide access to a strip of film supporting by the sound film cartridge along a film path in the camera so as to permit sound to be recorded on the film, said cover having a lug and at least one locking hook at one end thereof, the improvement comprising:
- a mounting plate arranged opposite to the rear wall of the camera housing, said mounting plate defining an aperture and a first guide slot therein and having a bent portion which defines therein a plurality of second slots adapted to receive said locking hook and said lug of said cover;
- a cam plate vertically slidably mounted on the rear surface of said mounting plate, one side edge portion of said cam plate defining first, second and third cutouts and a third guide slot therein and the other side portion of said cam plate being bent normal to the remainder portion, said bent portion defining at least one locking slot therein, said locking slot locking said locking hook of the cover when the cover is fully closed and said cam plate defining a closed space with said mounting plate;
- a first lever pivotally mounted within said closed space on said mounting plate, one end of said first lever being provided with a first pivot pin and the other end thereof defining a fourth cutout which is substantially of the same shape as said third cutout of the cam plate;
- a second lever pivotally mounted within said closed space at one end portion on said first pivot pin mounted on said first lever, said second lever having a second pivot pin at a portion adjacent to the other end thereof which is engaged with said lug of the cover when the cover is closed;
- a strip pivotally mounted within said closed space on said second pivot pin, and adapted to limit the movement of said second lever relative to said mounting plate.
- an element pivotally mounted within said closed space on said mounting plate at one end portion thereof, said element being provided at the middle portion thereof with a guide pin cooperating with said third guide slot of said cam plate and the other end portion thereof being offset so as to extend into said cartridge chamber of the camera through said aperture of the mounting plate, the tip end of said other end portion being bent normal to the remainder portion so as to be adapted to engage with one side of the sound film cartridge;
- a pinch roller mounting lever arranged in the cartridge chamber, one end of said pinch roller mounting lever extending through said first guide slot, cooperating with said third cutout of said cam plate, and being locked by said fourth cutout of said first lever in a position wherein a pinch roller mounted on said pinch roller mounting lever is adjacent to a capstan of a sound recording means when the cover is fully closed; and
- a spring anchored at one end thereof to a suitable portion of said cam plate and at the other end thereof to a suitable portion of said mounting plate so as to normally bias said cam plate upward and to hold said cam plate at a predetermined upper position when the cover is fully closed;
- said first pivot pin of said first lever, at the early stage of the downward movement of said cam plate in the opening operation of said cover, being laterally urged along said second cutout of the cam plate so as to swing said first lever to thereby retract said fourth cutout at the one end of said first lever from the locking position of said pinch roller mounting lever, whereby the pinch roller is moved to a fully retracted position by the downward movement of said third cutout of the cam plate, said locking hook of the cover being released from said locking slot of the cam plate so that said cover may be open,
- said guide pin of the element, at the subsequent stage of the downward movement of the cam plate, being laterally urged along said third guide slot so as to swing the element to thereby cause said bent portion of the element to raise one side of the film cartridge loaded in the cartridge chamber of the camera so that the cartridge may be ejected from the cartridge chamber, and
- means for partially retracting said cam plate by the force of said spring when the downward force of said cam plate is released and for then holding said cam plate in a position wherein said first pivot pin abuts against the lower edge of said first cutout so that said third cutout holds said pinch roller mounting lever in the retracted position.

4. A sound motion picture camera as set forth in claim 3, wherein said mounting plate forms a rear wall of said cartridge chamber.

5. A sound motion picture camera as set forth in claim 3, wherein a torsional spring is provided to urge said second lever toward said bent edge portion of the mounting plate, whereby said other end of said second lever is engaged with said lug of the cover when the cover is closed.

6. A sound motion picture camera as set forth in claim 3, wherein said mounting plate is separate from the rear wall of said cartridge chamber.

* * * * *